United States Patent Office 3,000,198
Patented Sept. 19, 1961

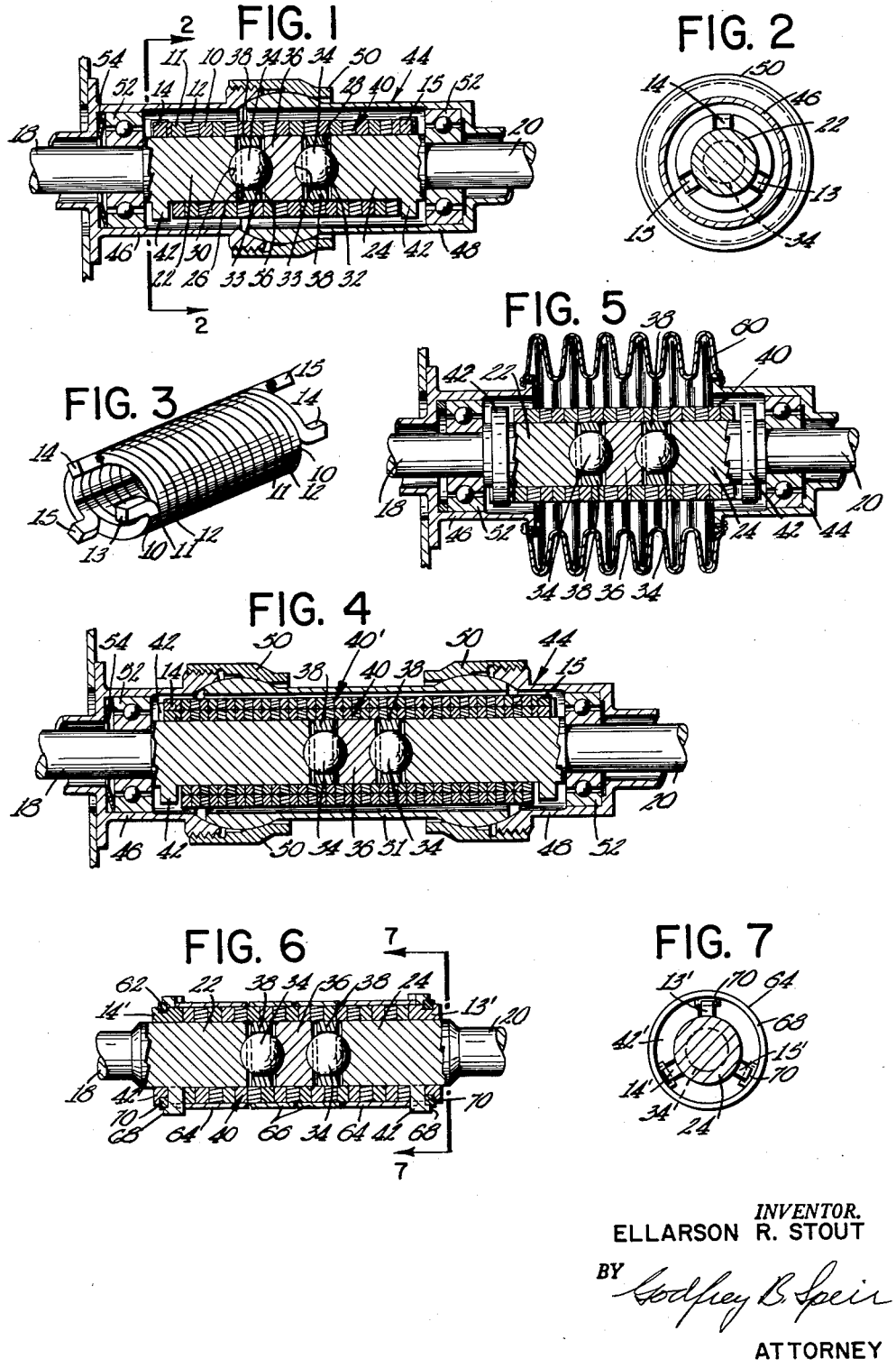

3,000,198
FLEXIBLE COUPLING FOR DRIVE SHAFTING
Ellarson R. Stout, Fayson Lakes, N.J., assignor to Curtiss-Wright Corporation, a corporation of Delaware
Filed Jan. 18, 1960, Ser. No. 2,955
7 Claims. (Cl. 64—15)

This invention relates to flexible shaft couplings of the type which will permit both angular and parallel misalignment between two shaft elements in end-to-end relation.

There are existing shaft couplings of this sort. One of these comprises merely a section of elastic hose slipped over the ends of two shafts, the drive being transmitted through the hose which because of its flexibility permits angular or parallel misalignment. However, such a coupling is very limited in its torque capacity due to wind up of the hose and possible collapse into the space between the ends of the shafts. Couplings have also been proposed which comprise a helical spring coil with its end coils engaging the ends of the shafts. In such a coupling all of the drive is transmitted through a single central coil of the spring which bridges the gap between the shaft ends. If there is greater spacing between the shaft ends than the width of the spring coil the latter can collapse upon excessive torque transmission. It has also been proposed to use multiple springs wound together so that the load is distributed among two or more spring coils. Such an arrangement is effective so long as the spacing between the shaft ends is less than the width of either spring coil, otherwise this coupling too can collapse. When the spacing between shaft ends is held to a dimension less than the width of a spring coil the angular misalignment between the shafts may be seriously limited and may be less than that which may be needed in the intended environment.

In the present invention, an object is to provide a multiple spring coil coupling in conjunction with space apart idler plugs within the springs, the space between plugs or between shaft ends and plugs being less than the width of any one spring coil. By the plural gaps between the plugs and between the shaft ends and plugs, a large amount of angular misalignment is tolerable and also because of this multiplicity of plugs parallel misalignment of the shafts is possible while still having a joint which can transmit torque to the full capacity of the tensile strength of the spring coils.

In preferred arrangements, the aforementioned plugs are evenly spaced from one another and are held in concentric relation with one another and with the shaft ends by ball locators disposed along the joint and coaxial with the shaft ends.

The details of the invention may be better understood by referring to the following detailed description, read in connection with the attached drawings in which:

FIG. 1 is an axial section through one embodiment of the invention,

FIG. 2 is a section on the line 2—2 of FIG. 1,

FIG. 3 is a perspective view of a multiple spring coil assembly as used in the coupling, FIG. 4 is a longitudinal section through an alternative arrangement of the invention, providing sets of oppositely wound spring coils to enable torque transmission in either direction, FIG. 5 is a longitudinal section through a joint such as that shown in FIG. 1 but providing a different form of cover boot, FIG. 6 is a longitudinal section through another alternative form of bi-directional coupling, and FIG. 7 is a section on the line 7—7 of FIG. 6.

Referring briefly to FIG. 3, this shows a typical arrangement of multiple spring coil as used in the several embodiments of the coupling. Herein there are three helical springs, each wound from square wire, respectively designated as 10, 11, and 12. They can be slightly spaced wound individually and then are coiled into one another before or after which, the respective ends of the springs are turned over as driving tabs 13, 14 and 15.

In FIG. 1, substantially coaxial shaft ends 18 and 20 are provided with drum portions 22 and 24, the facing ends 26 and 28 of the drums having more or less spherical recesses 30 and 32 therein, in which are seated balls 34. Between the balls 34 is a spacer plug 36, having spherical recesses 30 at its ends in which the balls 34 are seated. The plug 36 is of the same diameter as the drums 22 and 24. Embracing each ball is a plug 38 in the form of a washer or annulus, the outside diameter thereof being the same as the drums 22 and 24, and the length thereof being somewhat less than the space between the adjacent plug and shaft end. The spring coil assembly of FIG. 3, designated in its entirety as 40, is sleeved over the drums 22 and 24 and over the plugs 36 and 38. The tabs 13, 14 and 15 at the ends of the spring assembly are engaged with driving lugs 42, preferably integral with the drums 22 and 24.

Preferably, the shaft ends 18 and 20 should be so mounted that they are resiliently urged toward one another, and so that they may articulate relative to one another. For this purpose, a housing 44 is provided which comprises portions 46 and 48 and a ball joint 50 securing them together. The shaft ends are mounted in the respective housing portions on bearings 52 which assume both axial and thrust load, one of the bearings, the left hand one as shown, being slidable in its housing portion 46 and being urged in a rightward direction by an elastic washer such as the Belleville washer 54. Thus, the washer 54 holds the balls 34 firmly in their sockets in the shaft elements so that for any angular or parallel misalignment between the shaft ends 18 and 20 the intervening plugs must follow a sinuous rather than a step pattern. Upon such misalignment the plugs 38 and 36 blend the misalignment of one shaft relative to the other and provide a relatively smooth path over which the spring assembly 40 may weave as drive is transmitted through the springs from one shaft element to the other. The spacing between shaft elements and plugs as identified at 56 should be less than the width of any one convolution of the springs of assembly 40 even under maximum or parallel misalignment operating conditions. By this means the coils of the spring assembly are prevented from collapsing into wide spaces and likewise are prevented from contracting unduly as the spring coils wrap upon the shaft ends and plugs during the transmission of torque.

It will be appreciated that this constitutes a one-way driving coupling, the drive direction being such that the spring coils are wound down upon the shafting. The spring tabs at each end of the assembly establish a definite position relation between the shaft ends 18 and 20. Should such definite positioning be unnecessary, the tabs 13, 14 and 15 and also the lugs 42 may be omitted and power drive is afforded by the wrapping action of the springs upon the shafts. In such an application, the free internal diameter of the spring coils is established as slightly smaller than the diameters of the drums and plugs, and the coils can be calculated, if desired, to slip on the drums when a limiting torque is exceeded.

In FIG. 4 an arrangement is shown which has many elements in common with that of FIG. 1 and corresponding elements are given the same reference characters. In this arrangement two housing ball joints 50 separated by a housing portion 51, are incorporated to better allow for parallel misalignment. FIG. 4 also includes a second set of spring coils 40' wound in the opposite direction from, and sleeved over the spring coils 40. The tabs of the respective sets of spring coils engage the shaft lugs 42 in the same fashion as previously described. Bi-directional drive is afforded in this coupling, the spring coils 40 effecting the drive in one direction and the spring coils 40' effecting the drive in the other direction. The plugs 36 and 38, as previously described, support the spring coils 40 against contraction, while the spring coils 40 support the spring coils 40' when the latter are driving.

FIG. 5 shows a drive coupling whose internal portions are the same as in FIG. 1 and similar reference characters are applied to similar parts. However, in this arrangement a spring boot 60 replaces the housing ball joint 50 to allow angular and parallel misalignment of the shaft ends 18 and 20. The spring boot which urges the two housing portions 44 and 46 toward one another and removes the requirement for the spring washer 54.

FIG. 6 shows another alternative arrangement of the coupling which is organized for bi-directional drive. In this arrangement, the shaft ends, drums, balls and plugs are essentially the same as in FIG. 1 and bear the same reference characters. The spring coil assembly 40 is essentially the same as previously described except that the tabs 13', 14', and 15' are formed with external notches 62. The outer portion of the spring coil assembly 40 is embraced by a plurality of annular sleeves 64 and 66, the sleeves 64 being notched at their ends to engage the lugs 42' and the sleeves 66 floating freely between the sleeves 64 with end clearance therebetween. The outer ends of the lugs 42' are provided with lips 68 extending outwardly and upon assembly of the coupling, keys 70 (or split snap rings) are inserted between the lips 68 and the tabs 13', 14', and 15', in the notches 62, so that the entire assembly is secured and all parts are held in place. In this connection the keys 70 are inserted after slightly stretching the spring coil after which the spring coil contracts to hold the keys in place and to hold the shaft ends toward one another for location of the balls 34 in their sockets.

Upon drive of the system in one direction the coils of the spring assembly 40 contract on the shaft elements 22 and 24 and on the plugs 36 and 38 whereby torque is transmitted from one shaft end to the other through the spring coils as previously described. In the opposite direction of rotation however, the coils of the spring assembly 40 expand away from the shaft elements but are confined by the annular sleeves 64 and 66. This prevents the spring coils from unwinding and enables them to transmit torque from one shaft end to the other in compression, rather than in tension as for the other direction. The outward displacement of the spring coils is limited by the sleeves 64 and 66 which, of course, are placed in tension circumferentially. The plurality of sleeves 64 and 66 enables the coupling to articulate for angular and parallel misalignment, the spacing between the sleeve elements tolerating such misalignment without jamming the system. In both directions of operation, the balls 34 and their engagement with the drums 22, 24 and plug 36 constrain the misalignment to a sinuous rather than step path whereby no portion of the spring coils is placed under undue stress.

It will be clear to those skilled in the art that various changes and modifications may be made in the structure shown and described without departing from the spirit and scope of the invention as set out in the appended claims.

I claim:

1. A flexible coupling for substantially coaxial shafts in end-to-end spaced relation, comprising a multiple helical spring assembly, the assembly comprising two or more spring helices interwound with one another, one end of said assembly being sprung over the end of one shaft and the other end of said assembly being sprung over the end of the other shaft, and a plurality of substantially cylindrically shaped plugs of substantially the same diameter as said shafts disposed within said spring assembly and between the shaft ends, said plugs being spaced apart by a distance less than axial thickness of any one spring convolution.

2. A coupling according to claim 1 wherein alternate plugs are rings, balls disposed in the ring openings, said shaft ends and other plugs having coaxial pockets formed therein in which ball portions protruding from said rings are seated, whereby said plugs are held in concentric relation with said shaft ends.

3. A flexible coupling for substantially coaxial shafts in end-to-end spaced relation, comprising a helical coil to drivably connect the shaft ends, and a plurality of circular disc-like elements within the coil helix and between the shaft ends, said elements being coaxial with the coil and being constructed for articulation relative to said shaft ends and to each other, said elements having a maximum spacing between circumferential edges less than the axial thickness of the helical coil material.

4. A coupling according to claim 3 including means to hold said elements coaxial, and means to urge said shaft ends resiliently toward one another.

5. A flexible shaft assembly comprising a helical coil embracing a core assembly, said core assembly comprising a plurality of stacked disc-like elements, said elements being constructed to articulate relative to one another, and means to hold said elements in coaxial relation, said elements having a maximum axial edge spacing from one to the next which is less than the axial thickness of any one of said helical coils.

6. A flexible coupling for substantially coaxial shafts in end-to-end spaced relation, comprising a helical coil to drivably connect the shaft ends, a plurality of circular disc-like elements within the coil helix and between the shaft ends, said elements being coaxial with the coil and being constructed for articulation relative to said shaft ends and to each other, said elements being spaced apart by a distance less than the axial thickness of the helical coil material, and housing elements surrounding the coil and rotatably supporting said shafts, said housing elements being connected for relative angular movement.

7. A flexible coupling for substantially coaxial shafts in end-to-end spaced relation, comprising a helical coil to drivably connect the shaft ends, a plurality of circular disc-like elements within the coil helix and between the shaft ends, said elements being coaxial with the coil and being constructed for articulation relative to said shaft ends and to each other, said elements being spaced apart by a distance less than the axial thickness of the helical coil material, and housing means surround the coil and rotatably supporting said shafts, said housing means including a resilient portion which urges the shaft ends toward each other.

References Cited in the file of this patent

UNITED STATES PATENTS

| | | |
|---|---|---|
| 350,631 | Leaman | Oct. 12, 1886 |
| 1,387,726 | Karge | Aug. 16, 1921 |
| 1,950,448 | Heisterkamp | Mar. 13, 1934 |